United States Patent
Yun et al.

(10) Patent No.: US 8,704,488 B2
(45) Date of Patent: Apr. 22, 2014

(54) BATTERY PACK AND METHOD OF CONTROLLING THE SAME

(75) Inventors: Han-Seok Yun, Yongin-si (KR); Segawa Susumu, Yongin-si (KR); Eui-Jeong Hwang, Yongin-si (KR); Se-Sub Sim, Yongin-si (KR); Jong-Woon Yang, Yongin-si (KR); Beom-Gyu Kim, Yongin-si (KR); Jin-Wan Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 372 days.

(21) Appl. No.: 13/011,785

(22) Filed: Jan. 21, 2011

(65) Prior Publication Data

US 2012/0032641 A1 Feb. 9, 2012

(30) Foreign Application Priority Data

Aug. 6, 2010 (KR) .......................... 10-2010-0075989

(51) Int. Cl.
*H02J 7/00* (2006.01)
(52) U.S. Cl.
USPC .............................. 320/118; 320/116; 320/124
(58) Field of Classification Search
USPC .............................. 320/118, 116, 124; 429/320
See application file for complete search history.

(56) References Cited

U.S. PATENT DOCUMENTS

| 6,518,725 | B2* | 2/2003 | Marten | 320/116 |
| 7,609,030 | B2* | 10/2009 | Uesugi et al. | 320/118 |
| 2002/0190692 | A1* | 12/2002 | Marten | 320/116 |
| 2003/0044689 | A1* | 3/2003 | Miyazaki et al. | 429/320 |
| 2004/0036446 | A1* | 2/2004 | Iwashima | 320/116 |
| 2005/0212481 | A1* | 9/2005 | Nakada | 320/116 |
| 2006/0022639 | A1* | 2/2006 | Moore | 320/116 |

FOREIGN PATENT DOCUMENTS

| JP | 2000-106220 | 4/2000 |
| JP | 2009-089566 | 4/2009 |
| KR | 1020050004544 A | 1/2005 |
| KR | 1020050062927 A | 6/2005 |
| KR | 10-2007-0105220 A | 10/2007 |

OTHER PUBLICATIONS

Korean Office Action dated Dec. 16, 2011 for Korean Patent Application No. KR 10-2010-0075989 which corresponds to captioned U.S. Appl. No. 13/011,785.

* cited by examiner

*Primary Examiner* — Yalkew Fantu
(74) *Attorney, Agent, or Firm* — Knobbe, Martens Olson & Bear, LLP (57) ABSTRACT

A battery pack and a method of controlling the same is disclosed. The battery pack determines a cell deviation after the battery pack is fully charged or over-discharged, and thus the battery pack can reduce the cell deviation by performing cell balancing.

11 Claims, 5 Drawing Sheets

BATTERY PACK AND METHOD OF CONTROLLING THE SAME

CROSS-REFERENCE TO RELATED APPLICATIONS

This application claims the benefit of Korean Patent Application No. 10-2010-0075989, filed on Aug. 6, 2010, in the Korean Intellectual Property Office, the disclosures of which are incorporated herein in their entirety by reference.

BACKGROUND

1. Field

The technical field relates to a battery pack and a method of controlling the same, and more particularly, to a battery pack for performing cell balancing of the battery pack and a method of controlling the battery pack.

2. Description of the Related Technology

In general, research into rechargeable batteries has been actively conducted due to the development of portable electronic devices such as cellular phones, laptop computers, camcorders, personal digital assistants (PDAs), and the like. In particular, such rechargeable batteries may be any of various types such as a nickel-cadmium battery, a lead storage battery, a nickel metal hydride battery (NiMH), a lithium ion battery, a lithium polymer battery, a metal lithium battery, or an air zinc battery. A rechargeable battery may be combined with a circuit so as to constitute a battery pack and is charged and discharged through an external terminal of the battery pack.

A general battery pack includes a battery cell and a peripheral circuit including a charge-discharge circuit, wherein the peripheral circuit is prepared as a printed circuit board and is combined with the battery cell. When an external power source is connected to an external terminal of the battery pack, the battery cell is charged by external power supplied through the external terminal and the charge-discharge circuit. When a load is connected to the external terminal, power of the battery cell is supplied to the load through the charge-discharge circuit and the external terminal. In this regard, the charge-discharge circuit controls charge and discharge of the battery cell occurring between the external terminal and the battery cell. In general, a plurality of battery cells are connected in series or in parallel, according to consumption of a load, to provide power to a device.

Respective battery cells constituting a battery pack have a capacity deviation due to variations in a manufacturing process. Accordingly, in a battery pack, deviations occur in a charge-discharge voltage of each battery cell during a charge-discharge cycle. Thus, in a battery pack, a specific battery cell may be over-charged during the charging, and a specific battery cell may be over-discharged during the discharging. As such, the over-charge or over-discharge of the specific battery cell in the battery pack reduces the capacity of the battery pack, degrades the battery pack, and shortens the lifespan of the battery pack.

SUMMARY OF CERTAIN INVENTIVE ASPECTS

One aspect is a battery pack including a plurality of battery cells and a computer. The computer is configured to determines voltages of the plurality of battery cells when the battery cells are in an open circuit voltage (OCV) state and performs cell balancing by comparing each of the determined voltages of the battery cells with a standard voltage.

Another aspect is method of controlling a battery pack including a plurality of battery cells and a computer. The method includes the steps of measuring voltages of the battery cells in an open circuit voltage (OCV) state, comparing each of the measured voltages of the battery cells with a standard voltage, and performing cell balancing on, from among the battery cells, a battery cell, from among the plurality of battery cells, in which a difference between the measured voltage and the standard voltage is more than a first threshold value.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF CERTAIN INVENTIVE EMBODIMENTS

Hereinafter, various aspects and features will be described more fully with reference to the accompanying drawings. In the description, only the detailed descriptions needed to understand operations according to some embodiments will be provided and other descriptions may be omitted so as not to hinder the understanding of the embodiments.

In addition, the terminology used in the specification and claims below should not be construed as being limited to a general or dictionary meaning; rather, the terminology should be construed as having a meaning and concept that meets a technical idea of the embodiments so as to appropriately express the present invention.

Figure 1:
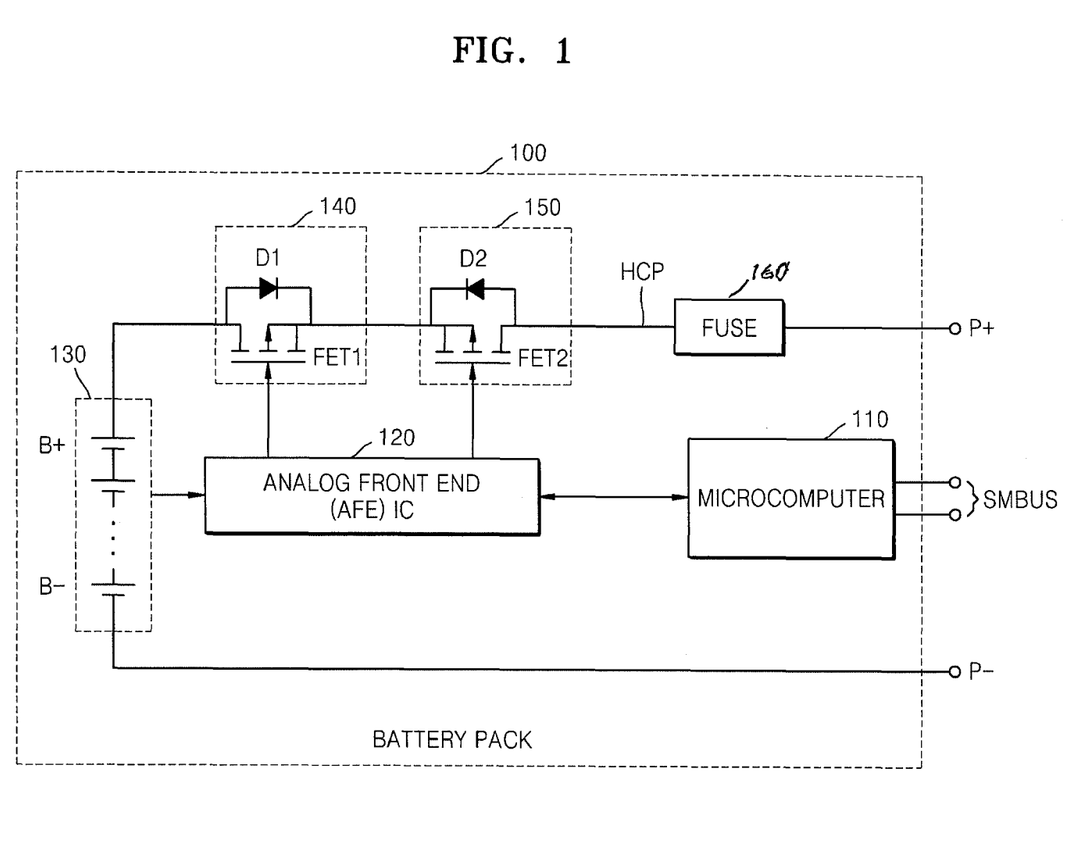
FIG. 1 is a circuit diagram illustrating a battery pack, according to some embodiments.

FIG. 1 is a circuit diagram illustrating a battery pack 100, according to some embodiments.

Referring to FIG. 1, the battery pack 100 according to some embodiments includes a rechargeable battery cell 130 and a protective circuit. The battery pack 100 is included in an external system, such as a laptop computer or a cellular phone, that may charge and discharge the battery cell 130.

The battery pack 100 includes the battery cells 130, an external terminal (not illustrated) connected in parallel to the battery cells 130, a charge device 140 and a discharge device 150 connected in series in a high current path (HCP) between the battery cells 130 and the external terminal. A fuse 160 is connected in series in the HCP between the discharge device 150 and the external terminal. An analog front end (AFE) integrated circuit (IC) 120 is connected in parallel to the battery cells 130, the charge device 140, and the discharge device 150, and the protective circuit. The protective circuit includes a microcomputer 110 having one end connected to the AFE IC 120 and another end connected to the fuse 160.

When the microcomputer 110 determines that the battery cells 130 are over-charged or over-discharged, the microcomputer 110 prevents over-charge and over-discharge of the battery cells 130 by turning off the charge device 140 and the discharge device 150.

The battery pack 100 is charged or discharged by being connected to the external system through the external terminal. The HCP between the external terminal and the battery cells 130 is used as a charge-discharge path and high current flows through the HCP. The battery pack 100 may further include a system management BUS (SMBUS) between the microcomputer 110 of the protective circuit and the external terminal in order to communicate with the external system.

The external system connected to the external terminal of the battery pack 100 may be a portable electronic device, for example, a laptop computer or a cellular phone, and may separately include an adaptor for supplying power. When the external system is connected to the adaptor, the external system may be driven by using the adaptor and the adaptor may supply power to the battery cells 130 through the external terminal and the HCP, thereby charging the battery cells 130. When the external system is separated from the adaptor, the battery cells 130 may be discharged to a load of the external system through the external terminal. That is, when the external system is connected to the external terminal connected to the adaptor, a charging operation occurs and a charging path thereof reaches the battery cells 130 through the adaptor, the external terminal, the discharge device 150, and the charge device 140. When the adaptor is separated from the external system and the load of the external system is connected to the external terminal, a discharging operation occurs and a discharging path thereof reaches the load through the battery cells 130, the charge device 140, the discharge device 150, and the external terminal.

The battery cells 130 are chargeable and dischargeable secondary battery cells. In FIG. 1, B+ and B− indicate power terminals of the battery cells 130, and P+ and P− indicate power terminals of the battery pack 100. The battery cells 130 output cell related information to the AFE IC 120, which will be described below, wherein the cell related information includes a cell temperature, a cell charge voltage, and an amount of current flowing in the battery cell 130.

The charge device 140 and the discharge device 150 are connected in series in the HCP between the external terminal and the battery cells 130 and respectively charge and discharge the battery pack 100. The charge device 140 and the discharge device 150 each include field effect transistors (FETs).

In general, a battery monitoring unit includes a balancing circuit for minimizing differences in voltages of a plurality of battery cells connected in series. That is, the battery monitoring unit senses a voltage of each battery cell. When the differences in voltages of the respective battery cells is more than a standard value, the battery monitoring unit generally performs cell balancing that ensures voltages of all battery cells are equal by discharging a battery cell having a relatively high voltage by force.

The AFE IC 120 is connected in parallel to the battery cells 130 between the charge device 140 and the discharge device 150 and is connected in series between the battery cells 130 and the microcomputer 110, which will be described below. The AFE IC 120 measures a voltage of the battery cells 130, transfers the measurement to the microcomputer 110, and controls operations of the charge device 140 and the discharge device 150 according to control signal sent by the microcomputer 110.

The microcomputer 110 is an IC connected in series between the AFE IC 120 and the external system, and functions to prevent over-charge, over-discharge, and over-current of the battery cells 130 by controlling the charge device 140 and the discharge device 150 via the AFE IC 120. That is, the microcomputer 110 compares the voltage of the battery cells 130, which is measured by and received from the AFE IC 120, with a voltage level value that is internally set, outputs a control signal to the AFE IC 120 according to a result of the comparison, turns the charge device 140 and the discharge device 150 on or off accordingly, and thus prevents over-charge, over-discharge, and over-current of the battery cells 130.

According to some embodiments, the microcomputer 110 determines whether to perform cell balancing or not by determining a voltage of the battery cells 130. The cell balancing may be divided according to a use state of the battery pack 100. First, the battery pack 100 is used when the battery pack 100 is fully charged and then is partially discharged. That is, cell balancing for maintaining differences in voltages of battery cells 130 within a predetermined value when the battery cells 130 are fully charged is required in order to prevent degradation in a fully charged state of the battery pack 100. Second, cell balancing for maintaining differences in voltages of battery cells 130 within a predetermined value in a fully discharged state of the battery pack 100 is required in order to minimize degradation of the battery pack 100 due to over-discharge.

The microcomputer 110 determines a voltage of the battery cells 130 measured in an open circuit voltage (OCV) state of the battery cells 130 and determines whether to perform cell balancing by comparing respective voltages of the battery cells 130 and a standard voltage. In this regard, the OCV denotes that a difference between a maximum value and a minimum value from among all the voltages of the battery cells 130 is less than a threshold value for a predetermined period of time. That is, the OCV denotes a stable state of the battery cells 130. In some embodiments, the OCV denotes a stable state of the battery cells 130 and does not denote only a state where a load is not connected to the battery pack 100. In detail, an OCV state is a state wherein a difference between a maximum value and a minimum value, from among all voltages of the battery cells 130, is less than a predetermined voltage, for a predetermined time, and all the voltages of the battery cells 130 thereof are defined as OCV voltages. For example, the OCV state can be a state wherein a difference between a maximum value and a minimum value, from among all the voltage of the battery cells is less than 75 mV for a period of 60 seconds, As illustrated in FIG. 1, the microcomputer 110 receives the OCV voltage from the AFE IC 120 and determines the battery cells 130 requiring cell balancing.

The microcomputer 110 determines voltages of a plurality of the battery cells 130 after being fully charged. The microcomputer 110 determines whether any difference in voltage between a particular battery cell having a minimum voltage from among the battery cells 130 and each voltage of the battery cells 130 is more than a first threshold value. If a difference in voltage is more than a first threshold value, it is determined that the particular battery cell requires cell balancing. For example, cell balancing is required for the battery cell in which any difference in the voltage of each of the battery cells 130 measured in the OCV state and the minimum voltage of the battery cells 130 is more than 30 mV. In addition, when a temperature of any of the battery cells 130 is within a predetermined temperature, for example, in the range of about 0° C. to about 50° C., measured by a temperature sensor (not shown) included in the battery cells 130, the microcomputer 110 may determine that the battery cell requires cell balancing.

The microcomputer 110 determines voltages of the plurality of battery cells 130 after being over-discharged. The microcomputer 110 determines that the battery cells 130 in which a voltage of the battery cells 130 is less than a second threshold value and the minimum voltage of the battery cells 130 is more than a third threshold value require cell balancing. For example, the microcomputer 110 determines that the battery cell in which the voltage of the battery cell in the OCV state is less than 3.2V and the minimum voltage of the battery cells 130 is more than 40 mV requires cell balancing. In addition, when the temperature of any of the battery cells 130 is in the range of about 0° C. to about 50° C., the microcomputer 110 may determine that the battery cell requires cell balancing.

The microcomputer 110 performs cell balancing on the battery cell requiring the cell balancing after determining whether to perform the cell balancing as described above. The microcomputer 110 may perform cell balancing in a sleep mode. In this regard, the sleep mode is a state wherein current does not flow into the battery pack 100 for a predetermined period of time.

As illustrated in FIG. 1, the microcomputer 110 selectively performs cell balancing on the battery cell requiring the cell balancing through the AFE IC 120.

Figure 2:
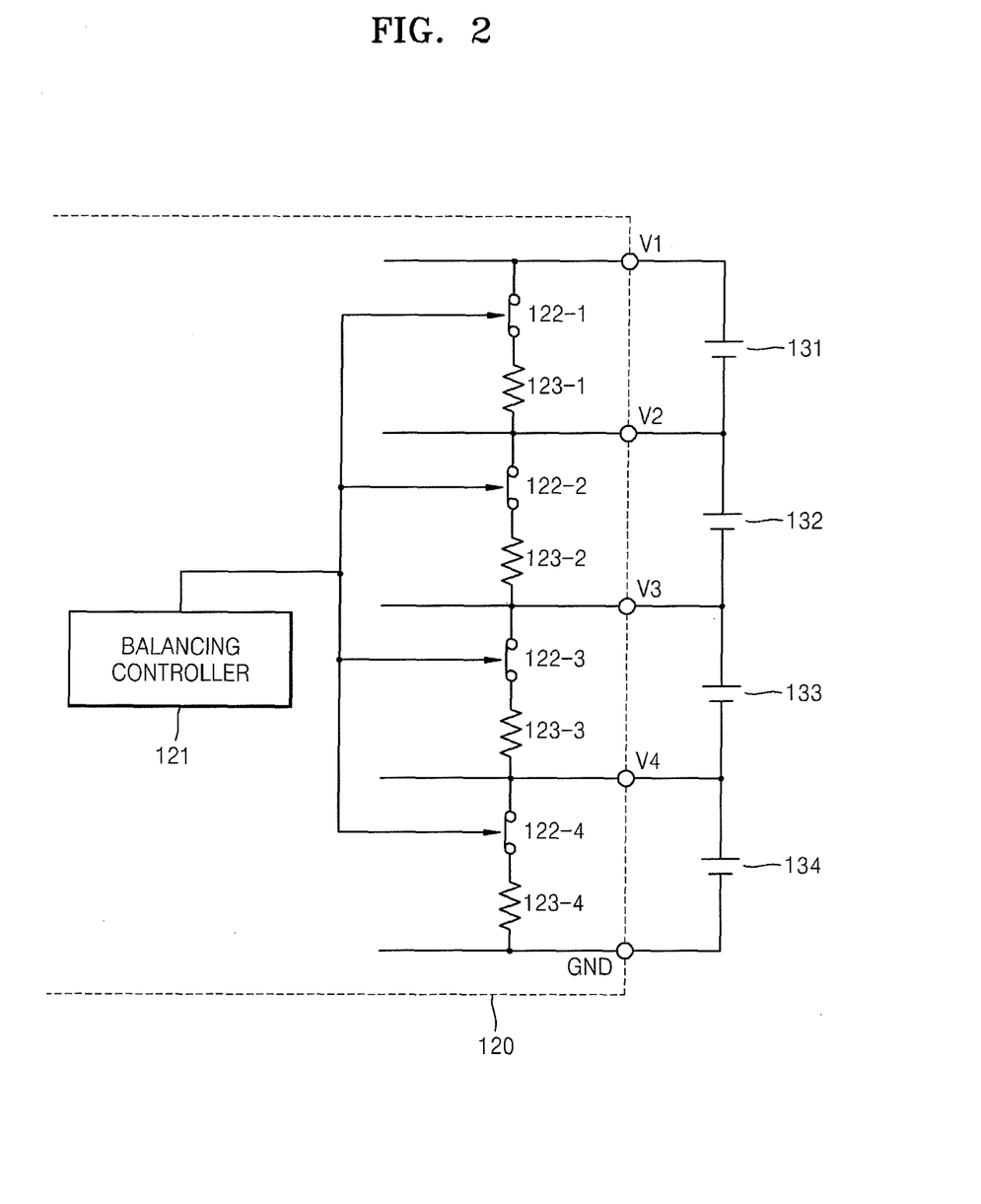
FIG. 2 is a circuit diagram for explaining cell balancing, according to some embodiments.

Referring to FIG. 2, the AFE IC 120 includes a balancing controller 121, a plurality of balancing switches 122-1 through 122-4 sequentially or simultaneously turned on or off by the balancing controller 121, and a plurality of balancing resistances 123-1 through 123-4 connected between the balancing switches 122-1 through 122-4. FIG. 2 illustrates a plurality of battery cells 131 through 134 connected in series and a plurality of balancing circuits connected to the respective battery cells 131 through 134, but numbers of the battery cells and the balancing circuits are not limited thereto.

The balancing controller 121 performs cell balancing by discharging the battery cell requiring cell balancing, from among the battery cells 131 through 134, through the balancing resistances 123-1 through 123-4 by turning on or off the balancing switches 122-1 through 122-4. In this regard, when cell balancing is performed on the plurality of battery cells at the same time, the cell balancing may be performed by dividing the battery cells into odd number battery cells and even number battery cells. For example, the cell balancing is performed on the odd number battery cells 131 and 133 for one minute, and then the cell balancing is performed on the even number battery cells 132 and 134 for one minute.

The microcomputer 110 determines a finishing condition of the cell balancing after performing the cell balancing. In this regard, the finishing condition of the cell balancing includes determining whether a voltage of the battery cell having undergone the cell balancing reaches a specific voltage value or whether a difference between the voltage of the battery cell having undergone the cell balancing and a minimum voltage of the battery cells is less than the specific voltage value. In addition, the microcomputer 110 may finish the cell balancing when the temperature of the battery cell is outside a predetermined range, for example when the battery cell temperature is below 0° C. or over 50° C.

In the case of cell balancing when the battery cell is fully charged, the microcomputer 110 may finish the cell balancing when a difference between the voltage of the battery cell having undergone the cell balancing and a minimum voltage of the battery cell is less than a predetermined value, for example 5 mV. In the case of cell balancing when the battery cell is over-discharged, the microcomputer 110 may finish the cell balancing when the minimum voltage of the battery cell is less than a predetermined value, for example 2.2V, or when the difference between the voltage of the battery cell having undergone the cell balancing and a minimum voltage of the battery cell is less than a predetermined value, for example 5 mV. When the minimum voltage of the battery cell is less than the predetermined value, for example 2.2V, the battery pack 100 itself may be turned off. Accordingly, in this case, the cell balancing may be finished.

Figure 3:
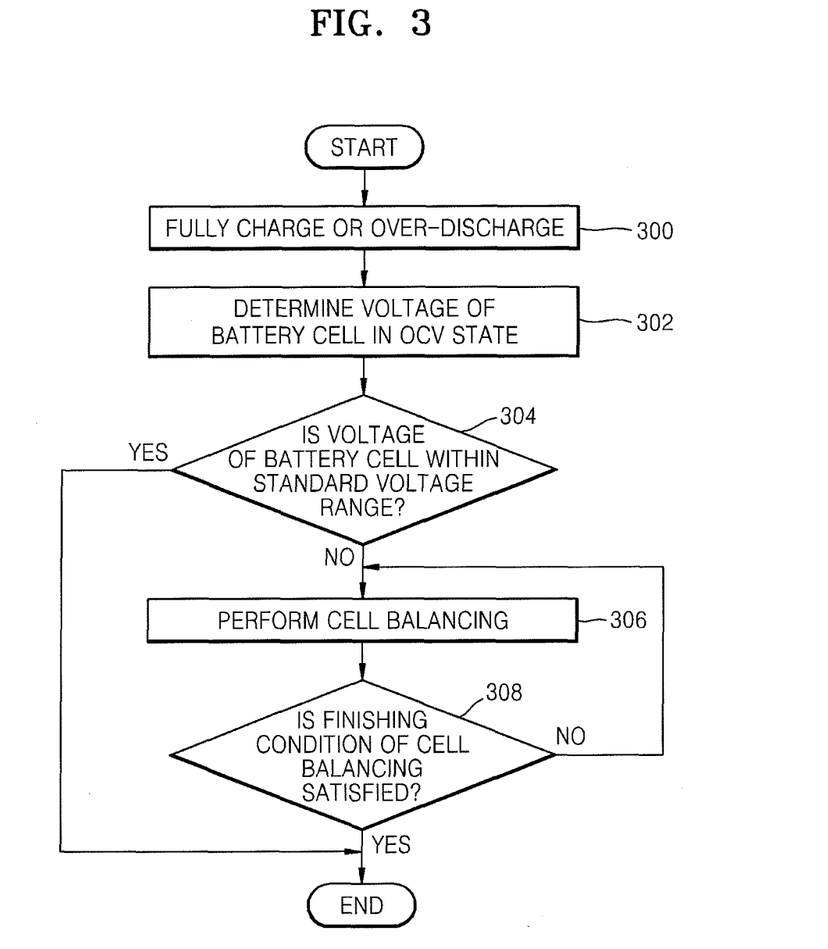
FIG. 3 is a flowchart for explaining a method of controlling a battery pack, according to some embodiments.

FIG. 3 is a flowchart for explaining a method of controlling a battery pack, according to some embodiments.

Referring to FIG. 3, in Operation 300, it is determined whether a battery cell is fully charged or over-discharged. In this regard, cell balancing is performed on the battery cell after fully charging or over-discharging the battery cell. In Operation 302, a voltage of the battery cell in an OCV state is determined. In this regard, the OCV state is a state where the battery cell is stable. The OCV state may be defined as a case where a difference between a maximum value and a minimum value, from among all voltages of the battery cells measured for a predetermined time, for example 60 seconds, is less than a predetermined voltage, for example, 75 mV. All the voltages of the battery cells measured in this case are measured as OCV voltages.

In Operation 304, it is determined whether the voltage of the battery cell in the measured OCV state is within the range of a standard voltage. When the voltage of the battery cell is outside the range of the standard voltage, the method proceeds to Operation 306, and cell balancing is performed.

In Operation 306, after the cell balancing is performed, it is determined whether the finishing condition of the cell balancing is satisfied. When the finishing condition of the cell balancing is satisfied, the cell balancing is finished and the operation ends. If the finishing condition is not satisfied, the method returns to Operation 306, and then the cell balancing is performed again.

Figure 4:
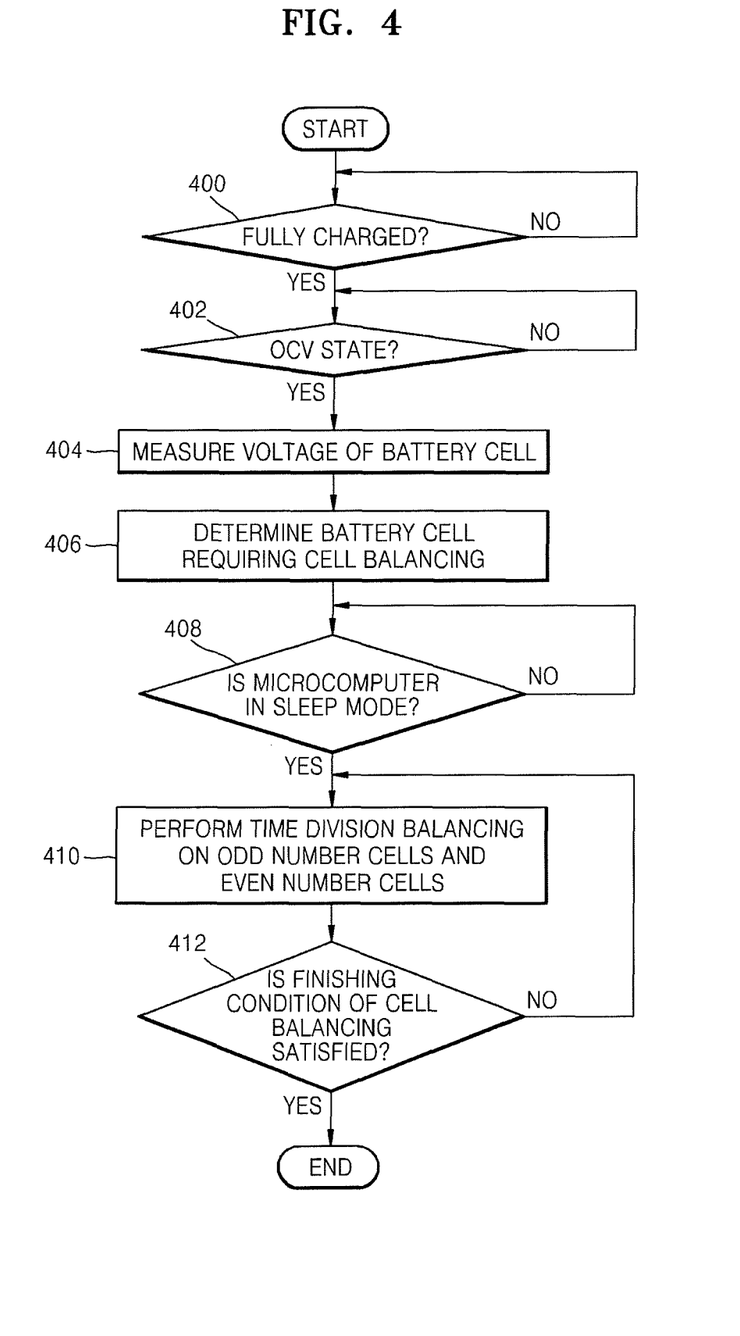
FIG. 4 is a flowchart for explaining a method of controlling a battery pack, according to some embodiments.

FIG. 4 is a flowchart for explaining a method of controlling a battery pack, according to some embodiments.

Referring to FIG. 4, in Operation 400, it is determined whether a battery cell is fully charged. For example, after charging of the battery cell is finished, if a predetermined period of time elapses, the charged voltage is stabilized. For example, a case where the voltage of the battery cell is maintained for a predetermined time over approximately 4.0V is determined as a fully-charged state. When the battery cell is fully charged, it is determined whether the battery cell is in the OCV state in Operation 402. In this regard, the OCV state is a state wherein a difference between a maximum value and a minimum value, from among all voltages of the battery cells measured for a predetermined period of time, is less than a predetermined voltage. When the battery cell is in the OCV state, a voltage of the battery cell in the OCV state is measured in Operation 404.

In Operation 406, it is determined which battery cell requires cell balancing by comparing a voltage of the battery cell in the OCV state with a standard voltage. Cell balancing is required for the battery cell in which a temperature of the battery cell is within a predetermined temperature range, and whose OCV voltage which was measured in the OCV state and a minimum voltage of the battery cell are more than a standard voltage. For example, the predetermined temperature range may be a range of 0° C. to about 50° C. and the standard voltage may be 30 mV In Operation 408, it is determined whether a microcomputer is in a sleep mode. When the microcomputer is in the sleep mode, time division balancing is performed on odd number battery cells and even number battery cells in Operation 410. In this regard, when there are a plurality of the battery cells requiring cell balancing, Operation 408 is performed.

In Operation 412, it is determined whether a finishing condition of the cell balancing is satisfied. When the finishing condition of the cell balancing is satisfied, the cell balancing is finished. For example, the finishing condition of the cell balancing includes determining whether a voltage of the battery cell having undergone the cell balancing reaches a predetermined voltage value or whether a difference between the voltage of the battery cell having undergone the cell balancing and a minimum voltage of the battery cells is less than a predetermined voltage value. The predetermined voltage value for the difference between the voltage of the battery cell having undergone the cell balancing and the minimum voltage of the battery cells may be for example, 5 mV. In addition, the finishing condition of the cell balancing may include determining whether a temperature of the battery cell is outside a predetermined range. For example, it may be determined whether the temperature is below 0° C. or over 50° C.

Figure 5:
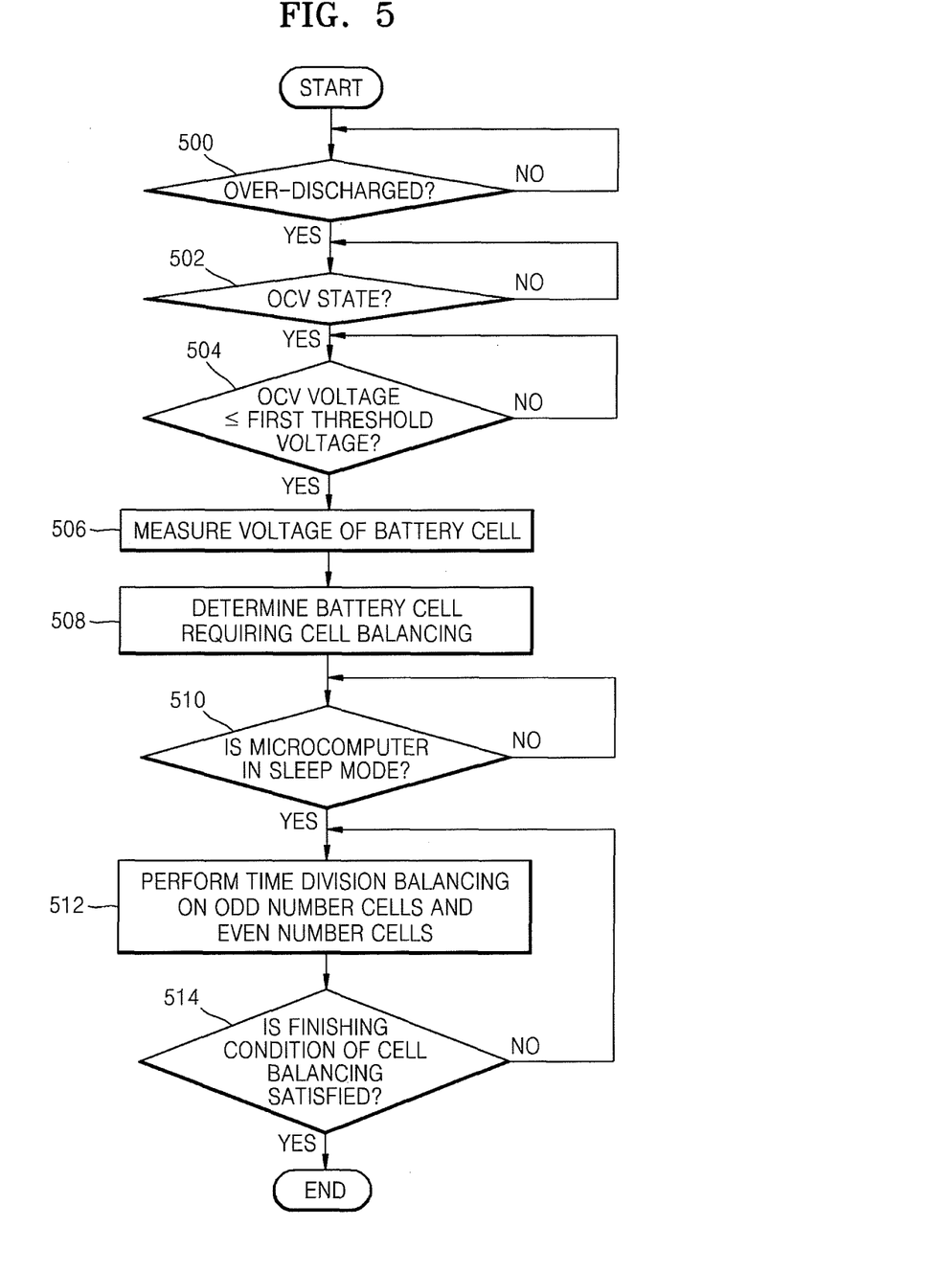
FIG. 5 is a flowchart for explaining a method of controlling a battery pack, according to some embodiments.

FIG. 5 is a flowchart for explaining a method of controlling a battery pack, according to some embodiments.

Referring to FIG. 5, in Operation 500, it is determined whether a battery cell is over-discharged. For example, after discharging of the battery cell is finished, a case where a maximum voltage of the battery cell is less than a first threshold value, for example 3.2V, may be determined as an over-discharging state. When the battery cell is over-discharged, it is determined whether the battery cell is in an OCV state in Operation 502. The OCV state is a state wherein a difference between a maximum value and a minimum value, from among all voltages of the battery cells measured for a predetermined period of time, is less than a predetermined voltage. When the battery cell is in the OCV state, it is determined whether an OCV voltage is less than a first threshold voltage, for example, 3.2V. The first threshold value may be predetermined as desired, and may be an OCV voltage value when a state of charge (SOC) is 0%. In Operation 504, when the OCV voltage is less than the first threshold value, a voltage of the battery cell in the OCV state is measured in Operation 506.

In Operation 508, it is determined which battery cell requires cell balancing by comparing a voltage of the battery cell in the OCV state with a standard voltage. For example, cell balancing is required for the battery cell in which a temperature of the battery cell is within a predetermined temperature range, and/or whose OCV voltage and/or a minimum voltage of the battery cells 130 are more than a predetermined value. The predetermined range of temperature may be a range of about 0° C. to about 50° C. and the predetermined value of voltage may be 40 mV.

In Operation 510, it is determined whether a microcomputer is in a sleep mode. When the microcomputer is in the sleep mode, time division balancing is performed on odd number battery cells and even number battery cells in Operation 512. When there are a plurality of the battery cells requiring cell balancing, Operation 408 is performed.

In Operation 514, it is determined whether to satisfy a finishing condition of the cell balancing. When the finishing condition of the cell balancing is satisfied, the cell balancing is finished. The finishing condition of the cell balancing includes determining whether a voltage of the battery cell having undergone the cell balancing reaches a specific voltage value, for example, 2.2V, or whether a difference between the voltage of the battery cell having undergone the cell balancing and a minimum voltage of the battery cell is less than a specific voltage value, for example, 5 mV. In addition, the finishing condition of the cell balancing may include determining whether a temperature of the battery cell is outside a predetermined temperature range. For example, it is determined whether the temperature of the battery cell is below 0° C. or over 50° C.

In a battery pack according to the above embodiments, the battery pack determines a cell deviation after the battery pack is fully charged or over-discharged, and thus the battery pack can reduce the cell deviation by performing cell balancing. The cell balancing may be performed when a microcomputer is in a sleep mode.

The specific voltage value and the threshold values have been represented by numerical values in the above embodiments with reference to the drawings. However, the present invention is not limited thereto. Thus, the numerical values may vary according to a cell capacity or an application field.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and etc. The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery pack comprising;
a plurality of battery cells; and
a computer,
wherein the computer is configured to:
determine voltages of the plurality of battery cells when the battery cells are in an open circuit voltage (OCV) state after the plurality of battery cells are fully charged or over-discharged;
determine a battery cell having a lowest voltage of the plurality of battery cells;
compare a difference between the a voltage of the battery cell having the lowest voltage and each of the voltages of the other of the plurality of battery cells to a specified value; and
perform cell balancing on at least one of the other of the plurality of battery cells if the voltage of the at least one of the other of the plurality of battery cells is larger than the voltage of the battery cell having the lowest voltage by more than the specified value;
wherein the computer is configured to perform the cell balancing in a sleep mode.

2. The battery pack of claim 1, wherein the OCV state is a state wherein a difference between a maximum value and a minimum value, from among the voltages of any one of the plurality of battery cells for a predetermined time, is less than a threshold value.

3. The battery pack of claim 1, wherein the computer is configured to perform the cell balancing by time-divisionally performing the cell balancing on odd numbered battery cells from among the at least one of the other of the plurality of battery cells and the cell balancing on even numbered battery cells from among the at least one of the other of the plurality of battery cells.

4. The battery pack of claim 1, wherein the computer is configured to determine a finishing condition of the cell balancing.

5. The battery pack of claim 4, wherein the determining of the finishing condition of the cell balancing comprises determining whether a voltage of a battery cell having undergone the cell balancing reaches a first threshold value.

6. The battery pack of claim 4, wherein the determining of the finishing condition of the cell balancing comprises determining whether a difference between the voltage of the battery cell having undergone the cell balancing and a minimum voltage of the plurality of battery cells is less than a second threshold value.

7. The battery pack of claim 1, wherein the computer performs the cell balancing when temperatures of the plurality of battery cells are within a predetermined temperature range.

8. A method of controlling a battery pack comprising a plurality of battery cells and a computer, the method comprising:
   determining whether the plurality of battery cells are fully charged or over-discharged;
   measuring voltages of the battery cells in an open circuit voltage (OCV) state when the plurality of battery cells are fully charged or over-discharged;
   determining a battery cell having a lowest voltage of the plurality of battery cells;
   comparing a difference between a voltage of the battery cell having the lowest voltage and each of the voltages of the other of the plurality of battery cells to a specified value;
   and
   performing cell balancing on at least one of the other of the plurality of the battery cells if the voltage of the at least one of the other of the plurality of the battery cells is larger than the voltage of the battery cell having the lowest voltage by more than the specified value;
   wherein the cell balancing is performed when the computer is in a sleep mode.

9. The method of claim 8, further comprising determining a finishing condition of the cell balancing.

10. The method of claim 8, wherein the OCV state is a state wherein a difference between a maximum value and a minimum value, from among the voltages of any one of the plurality of battery cells for a predetermined time, is less than a second threshold value.

11. The method of claim 8, wherein the cell balancing is performed by time-divisionally performing the cell balancing on odd numbered battery cells from among the at least one of the other of the plurality of battery cells and the cell balancing on even numbered battery cells from among the at least one of the other of the plurality of battery cells.

* * * * *